United States Patent
Abraham et al.

(10) Patent No.: US 11,620,195 B2
(45) Date of Patent: Apr. 4, 2023

(54) LINEAR VIEW-CHANGE BFT

(71) Applicant: VMware, Inc., Palo Alto, CA (US)

(72) Inventors: Ittai Abraham, Tel Aviv (IL); Dahlia Malkhi, Palo Alto, CA (US); Guy Golan Gueta, Holon (IL)

(73) Assignee: VMware, Inc., Palo Alto, CA (US)

( * ) Notice: Subject to any disclaimer, the term of this patent is extended or adjusted under 35 U.S.C. 154(b) by 370 days.

(21) Appl. No.: 16/898,055

(22) Filed: Jun. 10, 2020

(65) Prior Publication Data
US 2020/0301794 A1    Sep. 24, 2020

Related U.S. Application Data

(63) Continuation of application No. 16/005,351, filed on Jun. 11, 2018, now Pat. No. 10,713,133.

(51) Int. Cl.
| | |
|---|---|
| *G06F 11/00* | (2006.01) |
| *G06F 11/20* | (2006.01) |
| *H04L 9/32* | (2006.01) |
| *H04L 9/40* | (2022.01) |
| *H04L 67/1097* | (2022.01) |

(52) U.S. Cl.
CPC ...... *G06F 11/2056* (2013.01); *G06F 11/2023* (2013.01); *H04L 9/3247* (2013.01); *H04L 63/0823* (2013.01); *H04L 67/1097* (2013.01)

(58) Field of Classification Search
CPC ............ G06F 11/2056; G06F 11/2023; G06F 11/0709; G06F 11/3006; H04L 9/3247; H04L 63/0823; H04L 67/1097
See application file for complete search history.

(56) References Cited

U.S. PATENT DOCUMENTS

| | | | |
|---|---|---|---|
| 6,671,821 B1 | 12/2003 | Castro et al. | |
| 7,334,154 B2 | 2/2008 | Lorch et al. | |
| 2012/0254412 A1 | 10/2012 | Goose et al. | |
| 2018/0097638 A1* | 4/2018 | Haldenby | H04W 12/041 |
| 2018/0157558 A1 | 6/2018 | Karame et al. | |
| 2018/0307573 A1 | 10/2018 | Abraham | |
| 2019/0018984 A1 | 1/2019 | Zhou et al. | |
| 2019/0068380 A1* | 2/2019 | Tang | H04L 9/3236 |
| 2019/0097790 A1 | 3/2019 | Li et al. | |
| 2019/0129809 A1 | 5/2019 | Basu et al. | |

(Continued)

OTHER PUBLICATIONS

Ittai Abraham, et al., VMware Research, "Efficient Synchronous Byzantine Consensus", Sep. 24, 2017, 19 pages.

(Continued)

*Primary Examiner* — Joseph D Manoskey

(57) ABSTRACT

Techniques for implementing linear view-change in a Byzantine Fault Tolerant (BFT) protocol running on a distributed system comprising n replicas are provided. According to one set of embodiments, at a time of performing a view-change from a current view number v to a new view number v+1, a replica in the n replicas corresponding to a new proposer for new view number v+1 can generate a PREPARE message comprising a single COMMIT certificate, where the single COMMIT certificate is the highest COMMIT certificate the new proposer is aware of. The new proposer can then transmit the PREPARE message with the single COMMIT certificate to all other replicas in the n replicas.

21 Claims, 3 Drawing Sheets

(56) References Cited

U.S. PATENT DOCUMENTS

| | | |
|---|---|---|
| 2019/0243963 A1 | 8/2019 | Soriente et al. |
| 2019/0288993 A1 | 9/2019 | Lin |
| 2019/0294514 A1 | 9/2019 | Tang |
| 2021/0326352 A1* | 10/2021 | Manevich ............... G06F 16/27 |

OTHER PUBLICATIONS

Wenbing Zhao, "A Byzantine Fault Tolerant Distributed Commit Protocol", Third IEEE International Symposium on Dependable, Autonomic and Secure Computing, 2007, 8 pages.

Giuliana Santos Veronese et al., "Efficient Byzantine Fault-Tolerance", IEEE Transactions on Computers, vol. 62, No. 1, Jan. 2013, 15 pages.

Miguel Castro et al., "Practical Byzantine Fault Tolerance", Proceedings of the Third Symposium on Operating Systems Design and Implementation, New Orleans, LA, Feb. 22-25, 1999, 14 pages.

Related U.S. Appl. No. 16/005,351, filed Jun. 11, 2018, Notice of Allowance dated Mar. 25, 2020.

\* cited by examiner

LINEAR VIEW-CHANGE BFT

CROSS-REFERENCES TO RELATED APPLICATIONS

The present application is a continuation of U.S. patent application Ser. No. 16/005,351 filed Jun. 11, 2018, now U.S. Pat. No. 10,713,133 issued Jul. 14, 2020, entitled "Linear View-Change BFT", the contents of which are incorporated herein by reference in its entirety.

BACKGROUND

Byzantine fault tolerance (BFT) refers to the ability of a computing system to endure arbitrary (i.e., Byzantine) failures that would otherwise prevent the system's components from reaching consensus on decisions critical to the system's operation. In the context of state machine replication (i.e., a scenario where a system provides a replicated service whose operations and state are mirrored across multiple nodes, known as replicas), BFT protocols are used to ensure that non-faulty replicas are able to agree on a common order of execution for client-initiated service operations. This, in turn, ensures that the non-faulty replicas will run in an identical and thus consistent manner.

One well-known BFT protocol that is used in the state machine replication context is Practical BFT (PBFT) (see Castro et al., "Practical Byzantine Fault Tolerance," available at http://pmg.csail.mit.edu/papers/osdi99.pdf, incorporated herein by reference for all purposes). Generally speaking, PBFT and its variants operate according to a sequence of views. In each view, one replica, referred as a proposer, sends a proposal for a decision value (e.g., operation sequence number) to the other replicas and attempts to get 2f+1 replicas to agree upon the proposal, where f is the maximum number of replicas that may be faulty. If this succeeds, the proposal becomes a committed decision. However, if this does not succeed (due to, e.g., a proposer failure), the replicas enter a "view-change" procedure in which a new proposer is selected and the new proposer transmits a new proposal comprising votes received from replicas in the prior view.

Unfortunately, the transmission of this new proposal incurs a relatively high communication bit complexity of $n^3$, where n corresponds to the total number of replicas. In addition, the view-change procedure can recur O(n) times due to a cascade of up to f proposer failures. Thus, in conventional PBFT, the total amount of bits that may need to be transmitted as part of one or more view-changes before a single consensus decision is reached is $O(n^4)$. It is possible to reduce this by a factor of n using a feature known as threshold signatures, but even then the overall communication bit complexity is $O(n^3)$ which can pose significant scalability issues for even moderate system sizes (e.g., n=100).

SUMMARY

Techniques for implementing linear view-change in a Byzantine Fault Tolerant (BFT) protocol running on a distributed system comprising n replicas are provided. According to one set of embodiments, at a time of performing a view-change from a current view number v to a new view number v+1, a replica in the n replicas corresponding to a new proposer for new view number v+1 can generate a PREPARE message comprising a single COMMIT certificate, where the single COMMIT certificate is the highest COMMIT certificate the new proposer is aware of. The new proposer can then transmit the PREPARE message with the single COMMIT certificate to all other replicas in the n replicas.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide a more efficient scheme for performing view-changes in PBFT and other similar BFT protocols. This scheme is referred to herein as "linear view-change," or LVC. At a high level, LVC avoids the need to transmit $O(n^4)$ bits in order to carry out one or more view-changes and reach a consensus on a single decision; instead, the transmission of only $O(n^3)$ bits is needed ($O(n^2)$ bits per view-change, recurring up to n times). If PBFT is implemented with threshold signatures, the use of LVC requires the transmission of only $O(n^2)$ bits ($O(n)$ bits per view-change, recurring up to n times). Thus, LVC provides an $O(n)$ improvement in communication bit complexity over the current view-change procedure in PBFT (with or without threshold signatures).

2. System Environment and Existing PBFT Protocol

Figure 1:
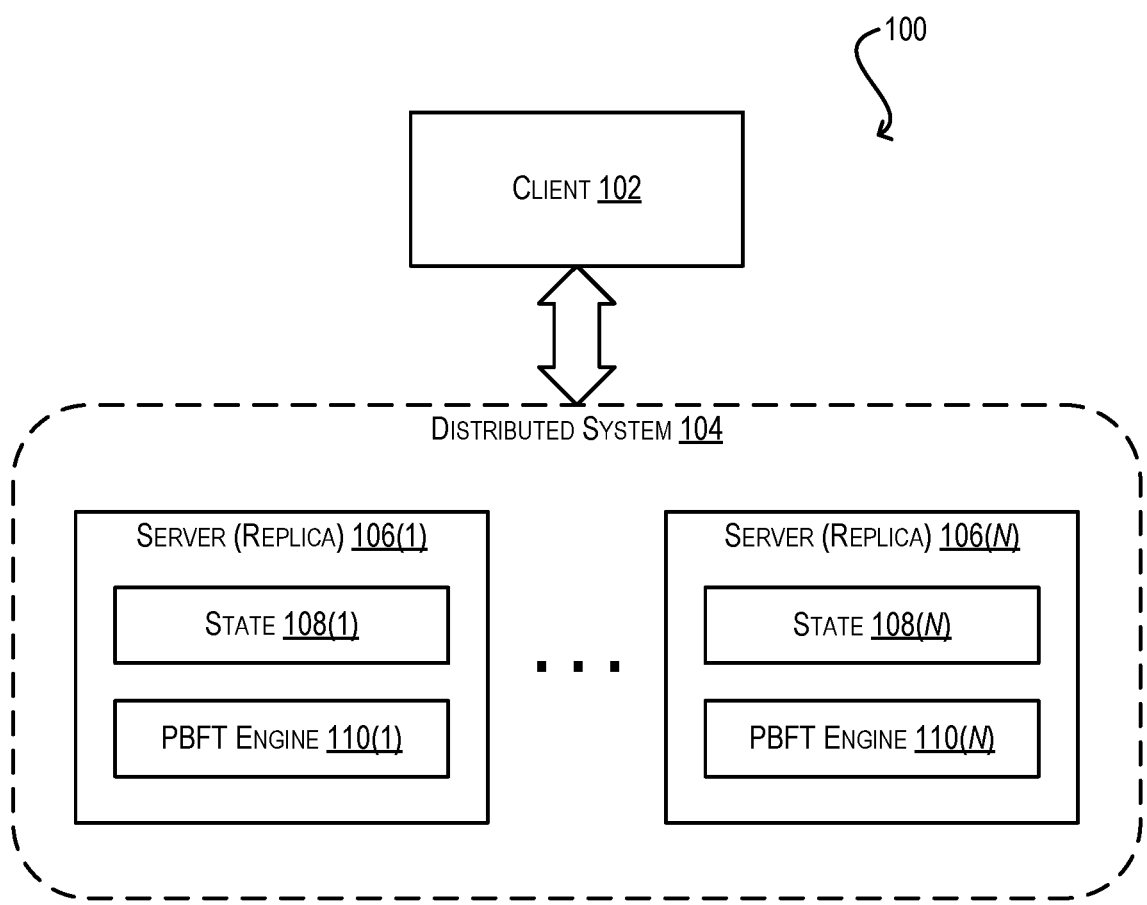
FIG. 1 depicts a system environment according to certain embodiments.

FIG. 1 is a simplified block diagram of a system environment 100 in which embodiments of the present disclosure may be implemented. As shown, system environment 100 includes a client 102 and a distributed system 104 comprising a plurality of n servers 106(1)–(n). Each server 106 may be a physical or virtual machine and is configured to run an identical instance of a replicated service (e.g., a data storage service, a blockchain service, etc.) provided by distributed system 104. Accordingly, each server 106 is referred to as a replica and includes replicated state 108 pertaining to its service instance. Client 102 is configured to consume the replicated service provided by distributed system 104 and thus submits, to replicas 106(1)–(n), requests to carry out service operations. Upon receiving these requests, each replica 106 executes the operations and updates its respective state 108 to reflect the results of those operations.

To ensure that replicas 106(1)–(n) sequence the execution of operations received from client 102 in a consistent fashion, distributed system 104 implements a BFT protocol via engines 110(1)–(n) residing on replicas 106(1)–(n). In FIG. 1, engines 110(1)–(n) specifically implement PBFT; however, distributed system 104 can use any one of a number of known BFT protocols that are similar to PBFT for this purpose. It is assumed that the total number of replicas n in distributed system 104 is greater than or equal to 3f+1 (where f is the maximum allowable number of faulty replicas) and that the PBFT protocol implemented via engines 110(1)–(n) provides two guarantees: (1) if a non-faulty replica assigns a particular sequence number to an operation, then all replicas will assign the same sequence number to that operation (i.e., safety), and (2) every operation will eventually be assigned a sequence number (i.e., liveness).

Figure 2:
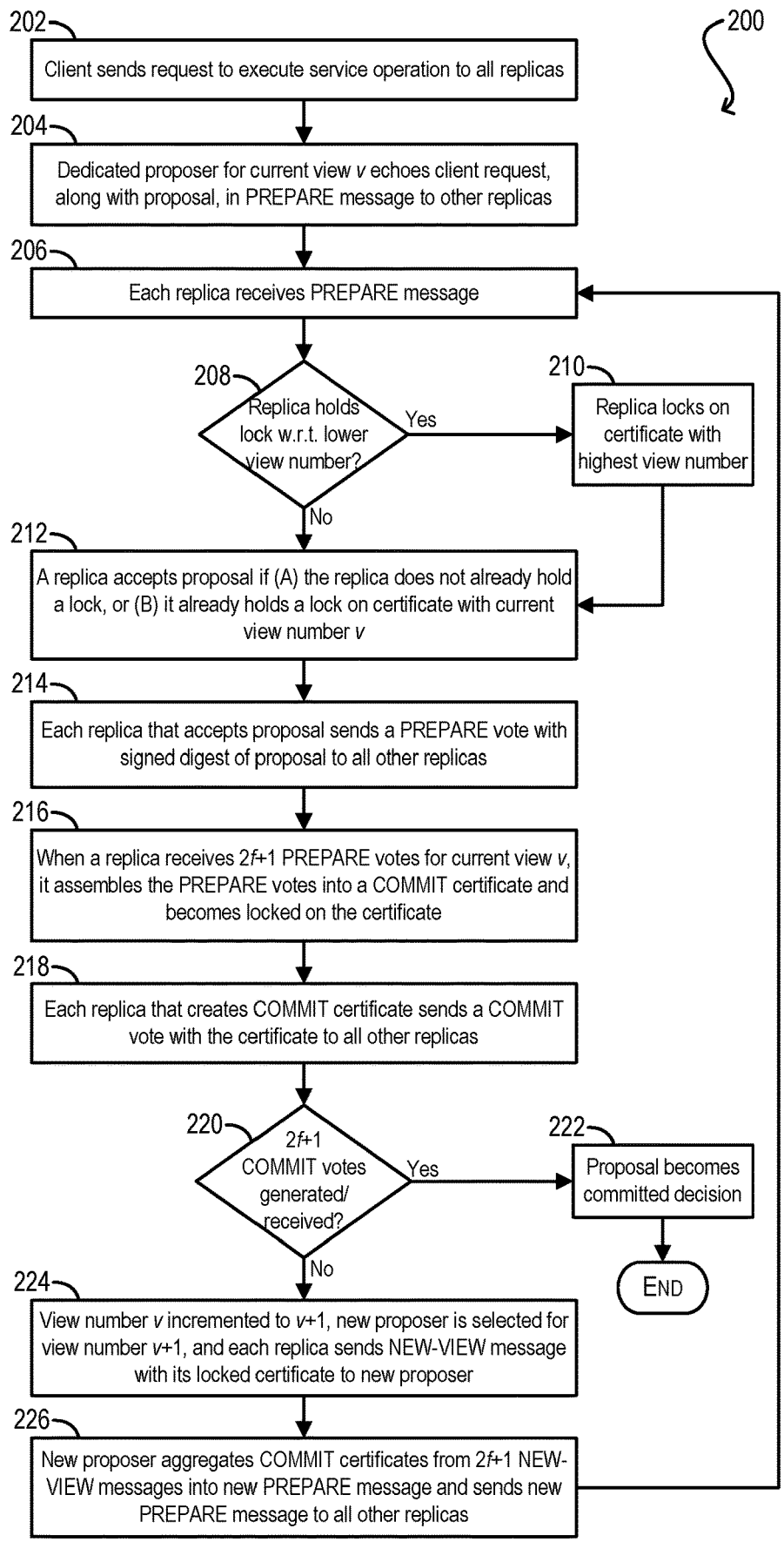
FIG. 2 depicts a PBFT workflow for a single consensus slot according to certain embodiments.

To explain how existing PBFT operates, FIG. 2 depicts a workflow 200 that illustrates the conventional protocol processing performed by replicas 106(1)–(n) via PBFT engines 110(1)–(n) for reaching consensus on a single decision, such as agreeing on the sequence number for a single client service request. This sometimes referred to as the PBFT processing for a "single consensus slot." Workflow 200 assumes that the messages passed between replicas 106(1)–(n) are digitally signed using standard cryptographic signatures to ensure the authenticity of each message.

Starting with block 202, client 102 sends a request to execute a service operation to all replicas 106(1)–(n). At block 204, a dedicated proposer (from among replicas 106(1)–(n)) for current view number v echoes the client request, along with a proposed sequence number for the request (referred to as a proposal), in a PREPARE message to all other replicas.

At block 206, each replica receives the PREPARE message from the proposer. If this is the first proposal from a new proposer (i.e., a proposer selected after a view-change), then the PREPARE message will carry 2f+1 COMMIT certificates (explained below). In this case, if the replica holds a "lock" on a COMMIT certificate associated with a lower view number than the 2f+1 COMMIT certificates, then the replica will adopt a new lock on the COMMIT certificate with the highest view number (blocks 208, 210). Then at block 212, the replica accepts the proposal if either (a) the replica does not hold any lock, or (b) it already holds a lock on a certificate corresponding to the request that is being proposed (i.e., a certificate associated with current view number v). Upon accepting the proposal, the replica sends a PREPARE vote with a signed digest of the proposal to all other replicas (block 214).

At block 216, when a replica receives 2f+1 PREPARE votes for the current view number v, it assembles the PREPARE votes into a COMMIT certificate. Thus, this COMMIT certificate can be viewed as a vector of 2f+1 values, each corresponding to a received PREPARE vote (or a digest thereof). The replica is said to become "locked" on the COMMIT certificate (and the proposal embodied by the PREPARE votes of the certificate) at this point. The replica then sends a COMMIT vote with the COMMIT certificate to all other replicas (block 218).

At block 220, if 2f+1 COMMIT votes are generated/received for a given COMMIT certificate, the proposal embodied in the COMMIT certificate is said to become a "committed decision" for the client request (in words, a decision consensus has been reached) (block 222) and workflow 200 ends.

However, if 2f+1 COMMIT votes are not generated/received for a given COMMIT certificate after some predetermined period of time (due to, e.g., a failure of the proposer), the current view number v is incremented to v+1, a new proposer is selected for view number v+1, and each replica sends a NEW-VIEW message carrying the COMMIT certificate it is locked on (if any) to the new proposer (block 224). This NEW-VIEW message signifies the initiation of a view-change to the next view number v+1.

Upon receiving 2f+1 NEW-VIEW messages from the various replicas, the new proposer aggregates the COMMIT certificates from the NEW-VIEW messages into a new PREPARE message (resulting in 2f+1 COMMIT certificates in the new PREPARE message) and transmits the new PREPARE message to all of the other replicas (block 226). Finally, workflow 200 returns to block 206 and the process repeats until a committed decision is reached.

3. PBFT with LVC

As mentioned in the Background section, because the new proposer transmits, within the new PREPARE message, 2f+1 COMMIT certificates (each comprising 2f+1 PREPARE votes) to all of the other replicas at the time of a view-change, the communication bit complexity of the view-change is $O(n^3)$ ($O(n)$ for the PREPARE votes per COMMIT certificate, $O(n)$ for the COMMIT certificates themselves, and $O(n)$ for the message broadcast the other replicas). Further, the view-change can recur up to f times (due to f proposer failures) before a committed decision is reached, resulting in a total communication bit complexity of $O(n^4)$. While this overhead is only encountered in the case of one or more unstable/faulty proposers, it is still undesirable for several reasons. For example, in some PBFT variants, view-changes may be employed even without proposer failures in order to promote fairness and protected against undetectable performance degradation attacks. Additionally, for even moderate system sizes (e.g., n=100), being hit with 100,000,000 transmissions in order to teach a single consensus decision is a significant scalability barrier.

Figure 3:
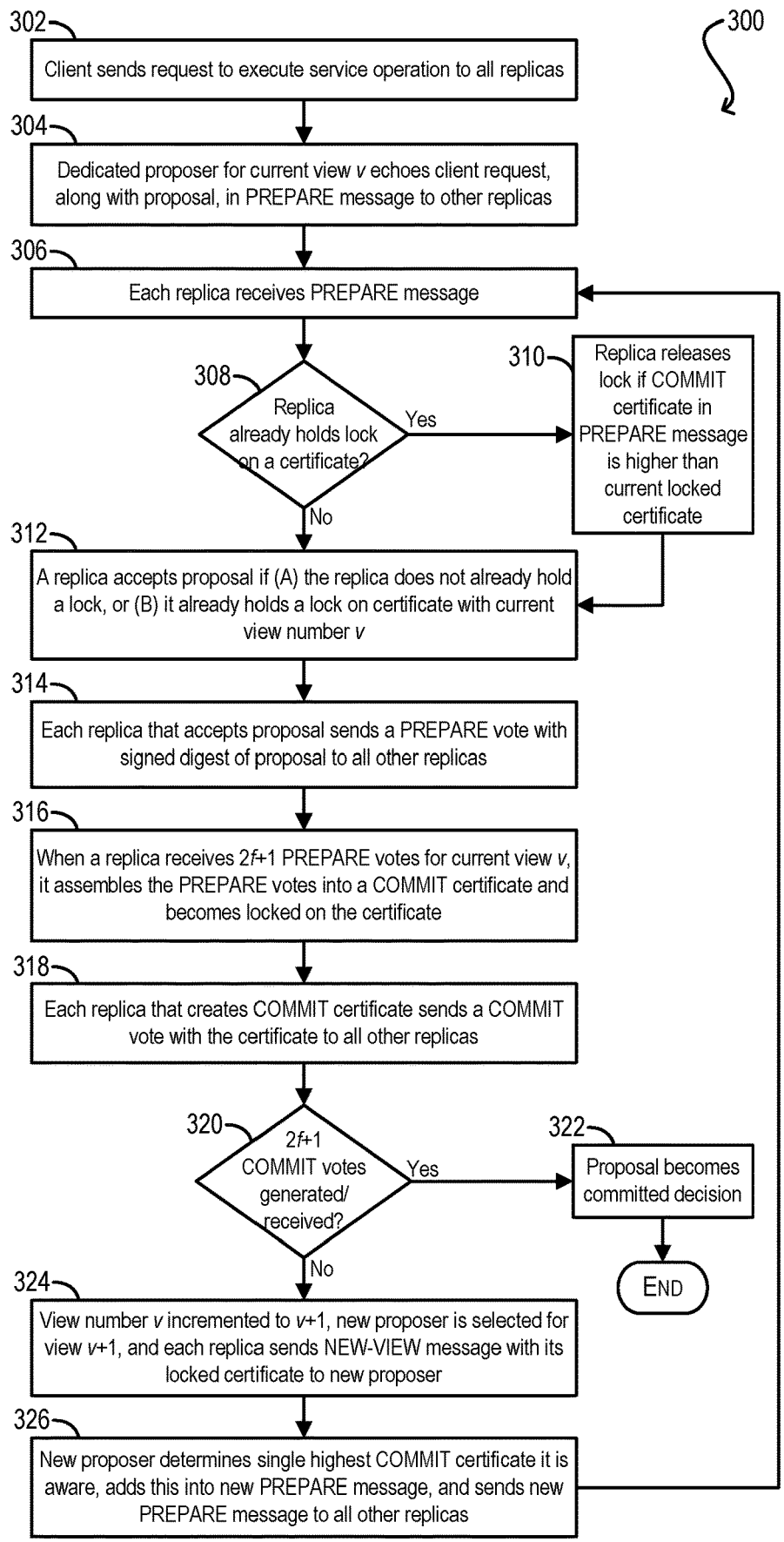
FIG. 3 depicts a version of the PBFT workflow of FIG. 2 that has been enhanced to implement LVC according to certain embodiments.

To address this, FIG. 3 depicts a modified version of the PBFT protocol workflow 200 of FIG. 2 (i.e., workflow 300) that implements linear view-change, or LVC according to an embodiment. Several of the steps of workflow 300 are similar to the corresponding steps of workflow 200. However, at block 324, the new proposer does not aggregate 2f+1 COMMIT certificates (from the NEW-VIEW messages received from the other replicas) into the new PREPARE message as in block 224 of workflow 200; instead, the new proposer determines the single "highest" COMMIT certificate that it is aware of (i.e., the COMMIT certificate created/locked during the highest, or most recent, view number) and adds this highest COMMIT certificate into the new PREPARE message. This highest COMMIT certificate may be the highest one from among the certificates received in the NEW-VIEW messages sent at block 322, or it may simply be the new proposer's own locked certificate. The new proposer then transmits the PREPARE message with the highest COMMIT certificate to all other replicas at block 304.

Since the PREPARE message created at block 326 only includes a single certificate comprising 2f+1 PREPARE votes, the communication bit complexity of this transmission is only $O(n^2)$, in contrast to $O(n^3)$ in PBFT workflow 200 of FIG. 2. Further, assuming up to f proposer failures, the overall complexity is only $O(n^3)$, in contrast to $O(n^4)$ in workflow 200. Thus, this LVC enhancement results in a linear improvement in complexity over conventional PBFT, which can be substantial for even moderate sizes of n.

It should be noted that, to preserve safety of the protocol, one additional change to PBFT is implemented at block 310 of workflow 300. In particular, at this step a correct replica will release its lock only if the COMMIT certificate included in the PREPARE message is higher (i.e., was created/locked during a higher view number) than the replica's current locked certificate. Stated another way, a correct replica will decline the new proposal embodied in the PREPARE message if it already holds a lock on a COMMIT certificate prepared during a higher view than the certificate included in the PREPARE message. Thus, even if the new proposer is faulty and attempts to hide the highest COMMIT certificate it is aware of, the proposer simply risks being declined by the non-faulty replicas and cannot damage the safety of the protocol.

It should also be noted that, while workflow 300 of FIG. 3 depicts the implementation of LVC within PBFT, this concept may also be applied to any other BFT protocol that make use of a similar view-change mechanism as PBFT. Some PBFT variants implement a speculative fast track or threshold signatures in order to improve communication complexity; in these variants, LVC can be used to further reduce the communication bit complexity of view-changes, on top of whatever reduction is already achieved by those other features. For example, the use of threshold signatures in PBFT reduces the communication bit complexity of a view-change to $O(n^2)$ and the overall complexity (in the face of f failures) to $O(n^3)$. Thus, if LVC is implemented in conjunction with threshold signatures, the communication bit complexity of a view change and the overall complexity can be further reduced to $O(n)$ and $O(n^2)$ respectively.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for implementing view-changes in a Byzantine Fault Tolerant (BFT) protocol running on a distributed system comprising n replicas, wherein no more than f of the n replicas are faulty, and wherein the BFT protocol enables at least 2f+1 of the n replicas to reach consensus on how to sequence execution of one or more operations, the method comprising, at a time of a view-change from a prior view v to a new view v+1 for sequencing execution of an operation o, by each non-faulty replica in the n replicas that has not been selected as a proposer for the new view v+1:

transmitting a first message to the proposer that includes, if said each non-faulty replica is currently locked onto a certificate comprising 2f+1 votes for a proposed sequence number for the operation o, a copy of the certificate; and in response to the transmitting, receiving a second message from the proposer that includes a single certificate selected from among a plurality of certificates, the plurality of certificates including the certificates received by the proposer via the first messages.

2. The method of claim 1 wherein the single certificate included in the second message is a certificate received by the proposer via the first messages that is associated with a highest view number.

3. The method of claim 1 further comprising, upon receiving the second message:

determining, by said each non-faulty replica, whether it is currently locked onto an existing certificate; and if it is currently locked onto an existing certificate, determining whether a view number associated with the single certificate included in the second message is higher than a view number associated with the existing certificate.

4. The method of claim 3 further comprising:
if the view number associated with the single certificate is higher than the view number associated the existing certificate, releasing, by said each non-faulty replica, its lock on the existing certificate and adopting a lock on the single certificate.

5. The method of claim 3 further comprising:
if the view number associated with the single certificate is not higher than the view number associated with the existing certificate, maintaining, by said each non-faulty replica, its lock on the existing certificate.

6. The method of claim 3 further comprising:
if said each non-faulty replica is not already locked onto an existing certificate, transmitting a vote for a proposed sequence number included in the second message to other replicas in the n replicas.

7. The method of claim 1 wherein the plurality of certificates includes a certificate on which the proposer is currently locked.

8. A non-transitory computer readable storage medium having stored thereon program code embodying a method for implementing view-changes in a Byzantine Fault Tolerant (BFT) protocol running on a distributed system comprising n replicas, wherein no more than f of the n replicas are faulty, and wherein the BFT protocol enables at least 2f+1 of the n replicas to reach consensus on how to sequence execution of one or more operations, the method comprising, at a time of a view-change from a prior view v to a new view v+1 for sequencing execution of an operation o, by each non-faulty replica in the n replicas that has not been selected as a proposer for the new view v+1:
transmitting, a first message to the proposer that includes, if said each non-faulty replica is currently locked onto a certificate comprising 2f+1 votes for a proposed sequence number for the operation o, a copy of the certificate; and
in response to the transmitting, receiving a second message from the proposer that includes a single certificate selected from among a plurality of certificates, the plurality of certificates including the certificates received by the proposer via the first messages.

9. The non-transitory computer readable storage medium of claim 8 wherein the single certificate included in the second message is a certificate received by the proposer via the first messages that is associated with a highest view number.

10. The non-transitory computer readable storage medium of claim 8 wherein the method further comprises, upon receiving the second message:
determining, by said each non-faulty replica, whether it is currently locked onto an existing certificate; and
if it is currently locked onto an existing certificate, determining whether a view number associated with the single certificate included in the second message is higher than a view number associated with the existing certificate.

11. The non-transitory computer readable storage medium of claim 10 wherein the method further comprises:
if the view number associated with the single certificate is higher than the view number associated the existing certificate, releasing, by said each non-faulty replica, its lock on the existing certificate and adopting a lock on the single certificate.

12. The non-transitory computer readable storage medium of claim 10 wherein the method further comprises:
if the view number associated with the single certificate is not higher than the view number associated with the existing certificate, maintaining, by said each non-faulty replica, its lock on the existing certificate.

13. The non-transitory computer readable storage medium of claim 10 wherein the method further comprises:
if said each non-faulty replica is not already locked onto an existing certificate, transmitting a vote for a proposed sequence number included in the second message to other replicas in the n replicas.

14. The non-transitory computer readable storage medium of claim 8 wherein the plurality of certificates includes a certificate on which the proposer is currently locked.

15. A distributed system comprising:
n replicas; and
a non-transitory computer readable medium having stored thereon program code that, when executed, enables the distributed system to implement view-changes in a Byzantine Fault Tolerant (BFT) protocol running on the distributed system, wherein no more than f of the n replicas are faulty, and wherein the BFT protocol enables at least 2f+1 of the n replicas to reach consensus on how to sequence execution of one or more operations, the program code causing, at a time of a view-change from a prior view v to a new view v+1 for sequencing execution of an operation o, each non-faulty replica in the n replicas that has not been selected as a proposer for the new view v+1 to:
transmit a first message to the proposer that includes, if said each non-faulty replica is currently locked onto a certificate comprising 2f+1 votes for a proposed sequence number for the operation o, a copy of the certificate; and
in response to the transmitting, receive, from the proposer, a second message that includes a single certificate selected from among a plurality of certificates, the plurality of certificates including the certificates received by the proposer via the first messages.

16. The distributed system of claim 15 wherein the single certificate included in the second message is a certificate received by the proposer via the first messages that is associated with a highest view number.

17. The distributed system of claim 15 wherein upon receiving the second message, the program code further causes said each non-faulty replica to:
determine whether it is currently locked onto an existing certificate; and
if it is currently locked onto an existing certificate, determine whether a view number associated with the single certificate included in the second message is higher than a view number associated with the existing certificate.

18. The distributed system of claim 17 wherein the program code further causes said each non-faulty replica to:
if the view number associated with the single certificate is higher than the view number associated the existing certificate, release its lock on the existing certificate and adopt a lock on the single certificate.

19. The distributed system of claim 17 wherein the program code further causes said each non-faulty replica to:
if the view number associated with the single certificate is not higher than the view number associated with the existing certificate, maintain its lock on the existing certificate.

20. The distributed system of claim 17 wherein the program code further causes said each non-faulty replica to:
  if it is not already locked onto an existing certificate, transmit a vote for a proposed sequence number included in the second message to other replicas in the n replicas.

21. The distributed system of claim 15 wherein the plurality of certificates includes a certificate on which the proposer is currently locked.

* * * * *